June 26, 1928.

W. B. LYNCH 1,675,036

AIR TRAPPING DEVICE FOR LUBRICATING CUPS

Filed Feb. 25, 1926

Inventor
WILLIAM B. LYNCH.

By Munn & Co.

Attorney

Patented June 26, 1928.

1,675,036

UNITED STATES PATENT OFFICE.

WILLIAM B. LYNCH, OF LONG BEACH, CALIFORNIA, ASSIGNOR TO ARCADIA LUBRICATOR COMPANY, OF LONG BEACH, CALIFORNIA, A CORPORATION OF CALIFORNIA.

AIR-TRAPPING DEVICE FOR LUBRICATING CUPS.

Application filed February 25, 1926. Serial No. 90,541.

My invention relates to self-feeding lubricating cups of that general character which employs the expansive action of air in the cup to deliver oil to a bearing, the air being expanded by the heat generated at the bearing.

It is essential in lubricating cups of this character that there be provided in the cup a quantity of air sufficient to provide the requisite pressure on the oil when the air is expanded by the action of heat to eject sufficient oil from the cup to properly lubricate the bearing with which it is associated. In filling the cup as heretofore proposed there is the constant danger of supplying an excessive quantity of oil to the cup, in which event practically all of the air is expelled from the cup. What little air remains in the cup will not, when heated, expand with sufficient force and rapidity to eject the oil and thus properly lubricate the bearing.

It is therefore a purpose of my invention to provide a simple and inexpensive device capable of being readily associated with a self-feeding lubricating cup of the character above specified which functions to limit the amount of oil introduced into the cup during the filling operation so as to positively insure the retention in the cup of sufficient air to render it, when heated, responsive with the required expansive force and rapidity to eject oil in sufficient quantity to properly lubricate a bearing.

I will describe only two forms of air trapping devices for lubricating cups embodying my invention, and will then point out the novel features thereof in claims.

Figure 1:
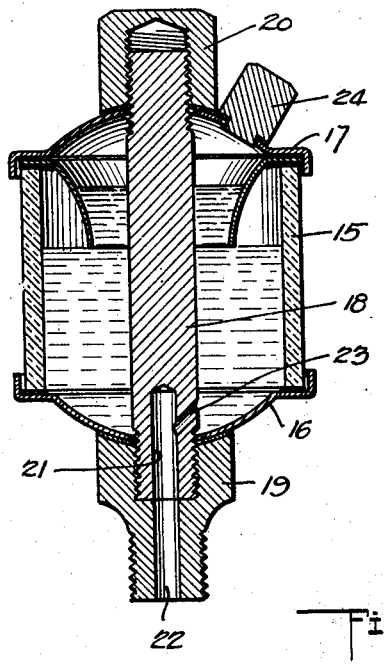
Figure 1 is a view showing in vertical section a self-feeding lubricating cup having applied thereto one form of air trapping device embodying my invention.

Referring specifically to the drawings, in which similar reference characters refer to similar parts in each of the views, my invention in both of its embodiments may be applied to any self-feeding lubricating cup which employs the expansion of air when heated to automatically feed the oil contained in the cup to a bearing. However, in the present instance I have shown a lubricating cup comprising a hollow cylindrical body 15, preferably formed of glass closed at its opposite ends by flanged caps 16 and 17, having axial openings through which the threaded ends of a member 18 extend, with the lower end engaging within a nipple 19 and the upper end engaged by a cap nut 20. The member 18 is shown as solid with the exception of a duct 21 in its lower end portion, which is in vertical alinement with the duct 22 of the nipple 19. A lateral duct 23 is formed in the member 18 at a point adjacent the bottom of the cup, and through this duct 23 oil from the cup can pass into the duct 21 and outwardly from the cup through the duct 22. The nipple 19 is exteriorly threaded for engagement within the suitable opening of a bearing (not shown), whereby oil discharged from the duct 22 is supplied to the bearing.

The body 15, together with the caps 16 and 17, provide an air-tight reservoir in which the oil being supplied to the bearing is stored, and this reservoir may be resupplied with oil as necessary through a filling opening normally closed by a screw plug 24.

Figure 2:
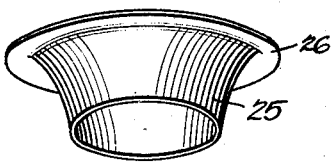
Figure 2 is a detail perspective view of the device shown in Figure 1.

The air trapping device shown in Figures 1 and 2 comprises a tubular body 25 which, in the present instance, is of frusto-conical form, with its large or upper end provided with a laterally extending annular flange 26. In the applied position of the device as shown in Figure 1, the flange 26 is clamped between the cap 17 and the upper end of the body 15, and with the body 25 in surrounding and spaced relation to the member 18, as well as in spaced relation to the wall of the body 15. With the device so positioned, it will be clear that when supplying oil to the reservoir through the filling opening to which access is had by removal of the plug 24, the oil is discharged into the device and then into the reservoir. When the level of the oil in the reservoir reaches the lower end of the device, it serves to seal the device against further expulsion of air from the reservoir so that the air between the bodies 25 and 15 is consequently trapped within the reservoir against expulsion. Should one continue to supply oil to the cup the oil will rise within the body 25 of the device until it overflows through the filling opening, but this does not interfere with the trapping of the air in the reservoir, as will be understood by reference to Figure 1.

The amount of air trapped as above described is sufficient to set up the necessary pressure when heated to force oil from the cup through the ducts 23, 21 and 22, it being understood that the air is heated by the heat generated at the bearing with which the cup is associated, or by the atmosphere around the cup.

Figure 3:
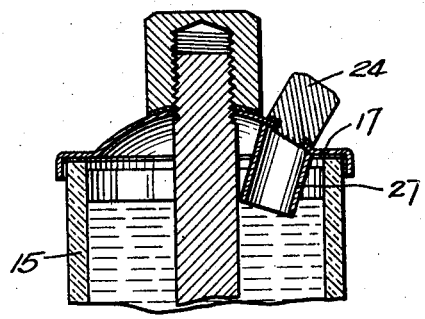
Figure 3 is a fragmentary vertical sectional view showing another form of air trapping device embodying my invention in applied position with respect to the cup.

Referring now to Figure 3, I have herein shown another form of air trapping device embodying my invention which comprises a tube 27 welded or otherwise secured at its upper end to the cap 17 and in surrounding relation to the filling opening, which latter is normally closed by the plug 24. This tube 27 functions in the same manner as that described in connection with the first device in that it operates to trap a quantity of air in the reservoir of the cup and in a manner to prevent the complete expulsion of air therefrom or the complete filling of the cup with oil, thus insuring at all times the retention in the cup of sufficient air to set up the necessary pressure when heated to expel the oil from the cup to the bearing.

Although I have shown and described only two forms of air trapping devices for lubricating cups embodying my invention, it is to be understood that various changes and modifications may be made therein without departing from the spirit of the invention and the spirit and scope of the appended claims.

I claim:

1. As an article of manufacture, an air trapping device for self-lubricating cups comprising a tubular body, and a flange on the body adapted to be clamped between one end of the body of the cup and a closure cap for the body so as to support the device in the cup.

2. As an article of manufacture, an air trapping device for self-lubricating cups comprising a tubular body of frusto-conical form, and an outwardly extending annular flange at the large end of the body adapted to be clamped between one end of the body of the cup and a closure cap for the body so as to support the device in the cup.

3. As an article of manufacture, an air trapping device for self-lubricating cups comprising a tubular body, and means on the body by which the latter is adapted to be clamped between one end of the body of the cup and a closure cap for the cup body so as to support the device in the cup.

WILLIAM B. LYNCH.